(12) United States Patent
Hoshino et al.

(10) Patent No.: US 7,627,292 B2
(45) Date of Patent: *Dec. 1, 2009

(54) APPARATUS AND METHOD FOR COMMUNICATION

(75) Inventors: Masayuki Hoshino, Yokosuka (JP); Toshiyuki Uehara, Yokohama (JP)

(73) Assignee: Panasonic Corporation, Osaka (JP)

( * ) Notice: Subject to any disclaimer, the term of this patent is extended or adjusted under 35 U.S.C. 154(b) by 86 days.

This patent is subject to a terminal disclaimer.

(21) Appl. No.: 11/857,552

(22) Filed: Sep. 19, 2007

(65) Prior Publication Data

US 2008/0008260 A1 Jan. 10, 2008

Related U.S. Application Data

(63) Continuation of application No. 10/545,002, filed on Aug. 10, 2005, now Pat. No. 7,289,474.

(51) Int. Cl.
*H04Q 7/00* (2006.01)
*H04B 1/02* (2006.01)

(52) U.S. Cl. .................. 455/101; 455/103; 370/334

(58) Field of Classification Search ............. 455/101, 455/103, 132, 140, 272, 273, 279.1; 370/310, 370/334; 375/219, 267
See application file for complete search history.

(56) References Cited

U.S. PATENT DOCUMENTS

| | | | |
|---|---|---|---|
| 6,760,388 B2 | 7/2004 | Ketchum et al. | 375/295 |
| 6,870,515 B2 * | 3/2005 | Kitchener et al. | 343/853 |
| 6,873,651 B2 | 3/2005 | Tesfai et al. | 375/219 |
| 6,931,362 B2 | 8/2005 | Beadle et al. | 702/190 |

(Continued)

FOREIGN PATENT DOCUMENTS

JP 2002 164948 6/2002

(Continued)

OTHER PUBLICATIONS

Chinese Office Action dated Sep. 19, 2008 with English translation thereof.

(Continued)

*Primary Examiner*—Sonny Trinh
(74) *Attorney, Agent, or Firm*—Dickinson Wright PLLC (57) ABSTRACT

An eigen value expansion section 103 calculates eigen values and eigen vectors in a correlation matrix or covariance matrix of input signals. When the ratio between a maximum eigen value and other eigen values is equal to or lower than a threshold, an assignment method selection section 104 selects a code assignment method whereby systematic bits are transmitted with their respective eigen vectors. As a result, a communication apparatus 100 transmits a systematic bit X with the respective eigen vectors. On the other hand, when the ratio between a maximum eigen value and other eigen values is greater than the threshold, the assignment method selection section 104 selects a code assignment method whereby systematic bits are transmitted with only the eigen vector having the maximum eigen value. As a result, the communication apparatus 100 transmits the systematic bit X with only the eigen vector having the maximum eigen value. This makes it possible to obtain an effect of improving sufficient communication quality even when the difference between the maximum eigen value and other eigen values is large in a communication system which combines a turbo code and MIMO.

4 Claims, 6 Drawing Sheets

U.S. PATENT DOCUMENTS

| | | | |
|---|---|---|---|
| 7,116,725 B2 * | 10/2006 | Ketchum et al. | 375/295 |
| 7,130,580 B2 | 10/2006 | Alexiou et al. | 455/39 |
| 7,197,082 B2 | 3/2007 | Alexiou et al. | 375/260 |
| 7,197,084 B2 * | 3/2007 | Ketchum et al. | 375/296 |
| 7,430,245 B2 * | 9/2008 | Ketchum et al. | 375/267 |
| 2002/0126763 A1 | 9/2002 | Jeong et al. | |
| 2002/0163975 A1 | 11/2002 | Uesugi et al. | |
| 2003/0060173 A1 | 3/2003 | Lee et al. | |
| 2004/0208145 A1 | 10/2004 | Sim et al. | 370/335 |
| 2005/0025262 A1 | 2/2005 | Tanabe et al. | 375/341 |
| 2005/0147177 A1 | 7/2005 | Seo et al. | 275/267 |
| 2005/0237920 A1 | 10/2005 | Howard et al. | 370/208 |
| 2006/0056534 A1 | 3/2006 | Ionescu et al. | 375/267 |
| 2006/0234729 A1 | 10/2006 | Murakami et al. | 455/462 |
| 2007/0098106 A1 | 5/2007 | Khojastepour et al. | 375/267 |
| 2007/0104165 A1 * | 5/2007 | Hanaoka et al. | 370/338 |

FOREIGN PATENT DOCUMENTS

| | | |
|---|---|---|
| JP | 2002 171298 | 6/2002 |
| JP | 2003 087191 | 3/2003 |
| JP | 2004 040232 | 2/2004 |
| WO | 02/062002 | 8/2002 |

OTHER PUBLICATIONS

Li Yue et al, "Algorithm Diversity in Adaptive Array Antenna," Journal of Military Communications Technology, vol. 23, No. 2, Jun. 2002, pp. 13-16.

PCT International Search Report dated Jun. 1, 2004.

M. Hoshino, et al.; "Jiku Turbo Fugo ni Okeru Antenna Sentaku Shuho ni Kansuru-Kento," 2003 Nen The Institute of Electronics, Information and Communication Engineers Tsushin Sogo Taikai Koen Ronbunshu, Tsushin 1, Mar. 3, 2003, p. S-49.

H. Kimura, et al.; "A Study on SDM Turbo Codes in a MIMO Channel," The Institute of Electronics, Information and Communication Engineers, Technical Report of IEICE, NS2002-65, RCS2002-93, Jul. 2002, pp. 19-24.

* cited by examiner

Eigen Vector A: [ASSIGNMENT METHOD INDICATION COMMAND "0" | SYSTEMATIC BIT X | PARITY BIT Y1]

Eigen Vector B: [SYSTEMATIC BIT X | PARITY BIT Y2]

FIG.4B

Eigen Vector A: [ASSIGNMENT METHOD INDICATION COMMAND "1" | SYSTEMATIC BIT X | PARITY BIT Y1]

Eigen Vector B: [PARITY BIT Y2 | PARITY BIT Y2]

EIGEN VECTOR A: ASSIGNMENT METHOD INDICATION COMMAND "0" | SYSTEMATIC BIT X | PARITY BIT Y1 | PARITY BIT Y2

EIGEN VECTOR B: SYSTEMATIC BIT X | PARITY BIT Y1 | PARITY BIT Y2

FIG.6B

EIGEN VECTOR A: ASSIGNMENT METHOD INDICATION COMMAND "1" | SYSTEMATIC BIT X | PARITY BIT Y1 | PARITY BIT Y2

EIGEN VECTOR B: PARITY BIT Y1' | PARITY BIT Y2' | PARITY BIT Y1' | PARITY BIT Y2'

APPARATUS AND METHOD FOR COMMUNICATION

This is a continuation of application Ser. No. 10/545,002 filed Aug. 10, 2005, which is a 371 of PCT/JP2004/001609 filed Feb. 16, 2004, which claims priority of JP 2003-040217 filed Feb. 18, 2003, the entire contents of each of which are incorporated by reference herein.

TECHNICAL FIELD

The present invention relates to a communication apparatus and communication method used in a communication system which combines a turbo code and MIMO (Multiple-Input Multiple-Output).

BACKGROUND ART

For a radio communication, an error correcting code is a technology indispensable for transmitting/receiving high-reliability information. A turbo code is becoming a focus of attention as a correcting code having a strong error correcting capacity in recent years.

Figure 1:
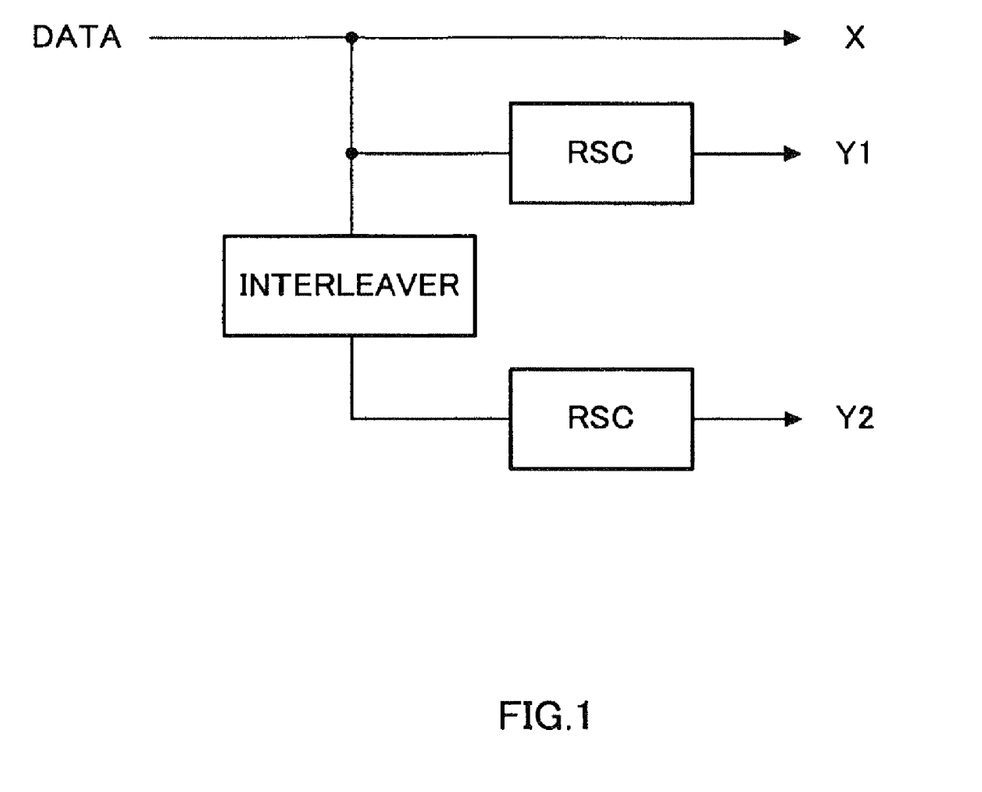
FIG. 1 illustrates an example of the configuration of a turbo coder.

A basic turbo coder is constructed of a parallel connection of a plurality of recursive systematic convolutional coders (RSC) through an interleaver as shown in FIG. 1 and outputs a systematic bit (information bit) X and parity bits Y1, Y2.

Furthermore, MIMO (Multiple-Input Multiple-Output) is becoming a focus of attention in recent years as a system for effectively realizing high-speed transmission using a limited frequency band.

The MIMO is a system which uses an array antenna for both transmission and reception to simultaneously transmit/receive independent signals on the same band using a plurality of eigen vectors. Using this MIMO makes it possible to expand a transmission capacity without expanding the frequency band.

There is also an on-going study for improving communication quality by combining a turbo code and MIMO.

Here, when the ratio between systematic bits and parity bits transmitted is equal among eigen vectors, the amount of improvement in communication quality increases as the respective eigen values become more uniform and the effect of improvement in communication quality decreases as the difference between a maximum eigen value and other eigen values increases.

However, in a conventional communication system, magnitudes of eigen values are not taken into consideration and the ratio between systematic bits and parity bits of each eigen vector always remains constant, and therefore when a difference between a maximum eigen value and other eigen values is large, the effect of improvement in communication quality using a turbo code decreases.

Especially in a situation such as a base station of a cellular system in which an antenna on the transmitting side is set high for the purpose of covering a wide range, a maximum eigen value becomes a value by far larger than other eigen values, and therefore it seems necessary to add certain improvement.

DISCLOSURE OF INVENTION

It is an object of the present invention to provide a communication apparatus and communication method in a communication system that combines a turbo code and MIMO capable of obtaining sufficient effects of improvement in communication quality even when there is a large difference between a maximum eigen value and other eigen values.

This object can be attained by measuring a ratio between the maximum eigen value and other eigen values and controlling the type of coded data to be transmitted with the respective eigen vectors based on the measurement result.

BEST MODE FOR CARRYING OUT THE INVENTION

The present inventor has come up with the present invention noting that since an amount of improvement in communication quality of MIMO is proportional to the magnitude of an eigen value, when a maximum eigen value is much greater than other eigen values, transmitting systematic bits with only an eigen vector having the maximum eigen value makes it possible to obtain a coding gain and improve the amount of improvement in communication quality.

With reference now to the attached drawings, embodiments of the present invention will be explained in detail below. As shown in the communication system in FIG. 2, a case where data is transmitted/received between a communication apparatus 10 and a communication apparatus 20 each provided with an array antenna using two eigen vectors A, B (suppose the eigen vector of a maximum eigen value is "A") will be explained. Also suppose that the communication apparatus of each embodiment encodes transmission data using the turbo coder shown in FIG. 1.

EMBODIMENT 1

Figure 2:
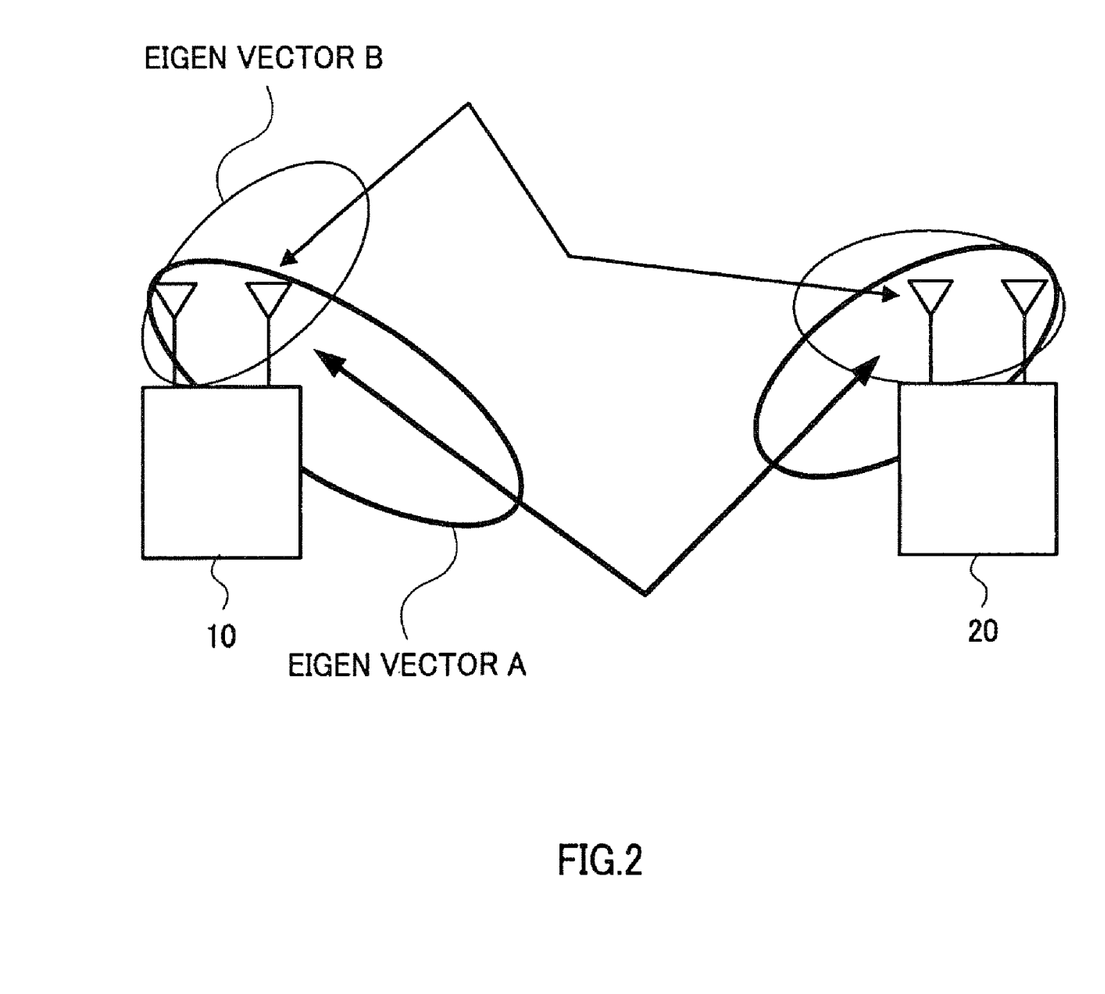
FIG. 2 illustrates an example of a communication system using MIMO.
Figure 3:
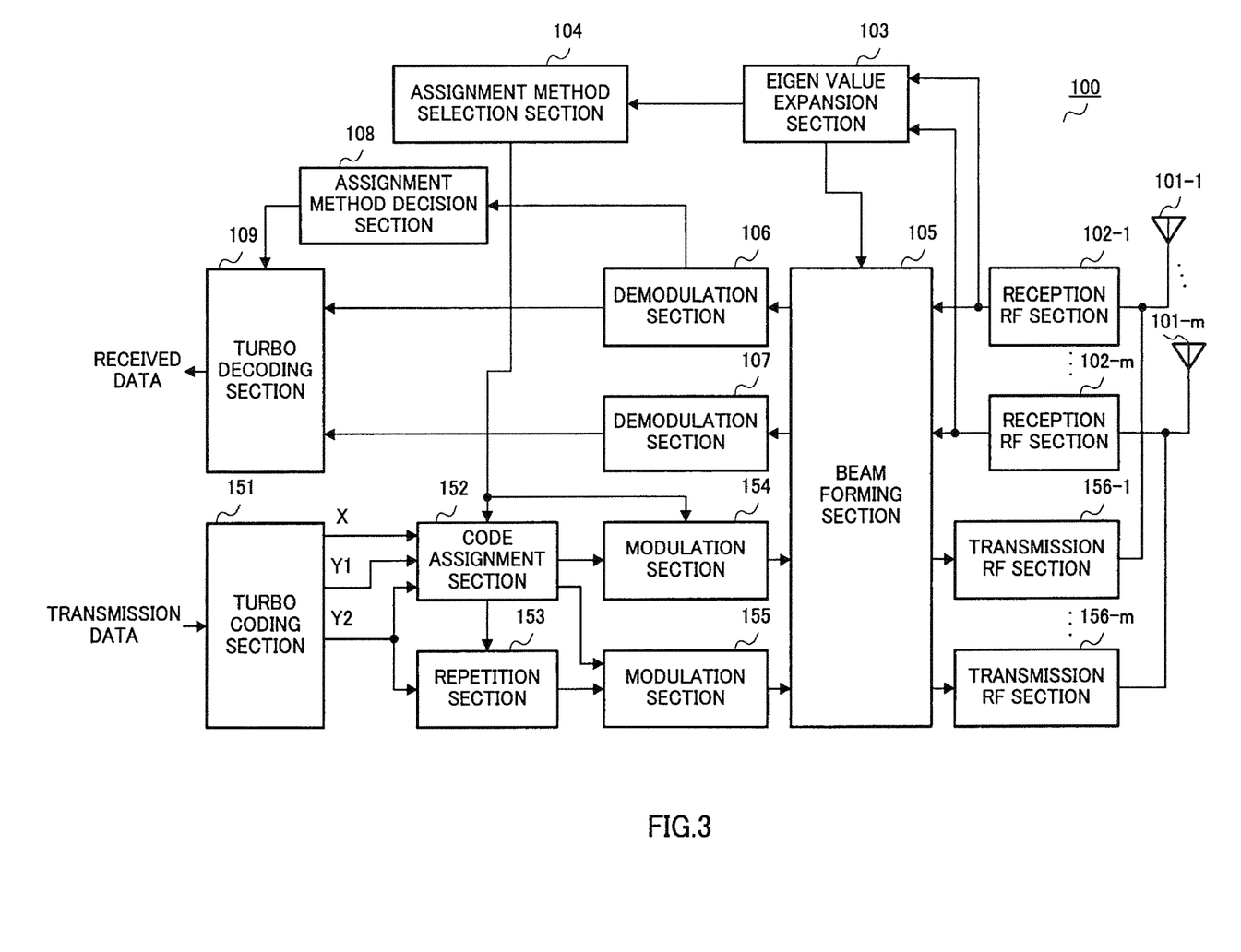
FIG. 3 is a block diagram showing the configuration of a communication apparatus according to Embodiment 1 of the present invention.

FIG. 3 is a block diagram showing the configuration of a communication apparatus according to Embodiment 1 of the present invention. The communication apparatus 100 in FIG. 3 is one of the communication apparatuses 10, 20 shown in FIG. 2.

The communication apparatus 100 in FIG. 3 is mainly constructed of antenna elements 101-1 to m, reception RF sections 102-1 to m, an eigen value expansion section 103, an assignment method selection section 104, a beam forming section 105, demodulation sections 106, 107, an assignment method decision section 108, a turbo decoding section 109, a turbo coding section 151, a code assignment section 152, a repetition section 153, modulation sections 154, 155 and transmission RF sections 156-1 to m.

The plurality of antenna elements 101-1 to m constitute an adaptive array antenna, receive a signal sent from the other party of communication, output the signal to the corresponding reception RF sections 102-1 to m and transmit signals output from the corresponding transmission RF sections 156-1 to m to the other party of communication by radio.

The reception RF sections 102-1 to m carry out radio processing such as amplification and down-conversion on the signals received by the corresponding antenna elements 101-1 to m and output baseband signals to the eigen value expansion section 103 and beam forming section 105.

The eigen value expansion section 103 calculates eigen values and eigen vectors of a correlation matrix or covariance matrix of input signals based on the signals output from the reception RF sections 102-1 to m and outputs the eigen values to the assignment method selection section 104 and the eigen vectors to the beam forming section 105.

The assignment method selection section 104 calculates the ratio between the maximum eigen value and other eigen values, compares this ratio with a preset threshold, selects a code assignment method based on the decision result and outputs a command indicating the selected code assignment method (hereinafter referred to as "assignment method indication command") to the code assignment section 152 and modulation section 154. The processing of the assignment method selection section 104 will be explained more specifically later.

The beam forming section 105 combines the signals output from the reception RF sections 102-1 to m using the eigen vectors output from the eigen value expansion section 103 and outputs the combined signal to the demodulation sections 106, 107. Furthermore, the beam forming section 105 divides signals output from the modulation sections 154, 155 into m portions corresponding in number to the antenna elements, carries out complex multiplication processing on each signal using eigen vectors and outputs these signals to the transmission RF sections 156-1 to m.

The demodulation section 106 demodulates the signal which is output from the beam forming section 105 and received with the eigen vector A, outputs a control signal to the assignment method decision section 108 and outputs the coded data to the turbo decoding section 109. Furthermore, the demodulation section 107 demodulates the signal which is output from the beam forming section 105 and received with the eigen vector B and outputs the coded data to the turbo decoding section 109.

The assignment method decision section 108 decides the code assignment method of the other party of communication based on the assignment method indication command included in the output signal of the demodulation section 106 and outputs the decision result to the turbo decoding section 109.

The turbo decoding section 109 carries out turbo decoding processing on the coded data output from the demodulation sections 106, 107 based on the decision result of the assignment method decision section 108 and extracts the received data.

The turbo coding section 151 carries out turbo coding processing on the transmission data and outputs coded data made up of a systematic bit X and parity bits Y1, Y2 to the code assignment section 152.

The code assignment section 152 outputs the coded data output from the turbo coding section 151 to the modulation section 154 or modulation section 155 based on the assignment method indication command from the assignment method selection section 104 and outputs a control signal to the repetition section 153. Details of the processing by the code assignment section 152 will be described in detail later.

The repetition section 153 carries out repetition processing on coded data (parity bit Y2) output from the turbo coding section 151 and outputs the coded data after repetition processing to the modulation section 155 according to the control signal from the code assignment section 152.

The modulation section 154 modulates data to be transmitted with the eigen vector A, which is the coded data output from the code assignment section 152 and an assignment method indication command from the assignment method selection section 104 and outputs the modulated signal to the beam forming section 105.

The modulation section 155 modulates data to be transmitted with the eigen vector B, which is the coded data output from the code assignment section 152 or the repetition section 153 and outputs the modulated signal to the beam forming section 105.

The transmission RF sections 156-1 to m carry out radio processing such as amplification and up-conversion on the signal output from the beam forming section 105 and output the processed signals to the corresponding antenna elements 101-1 to m.

Figure 4A:
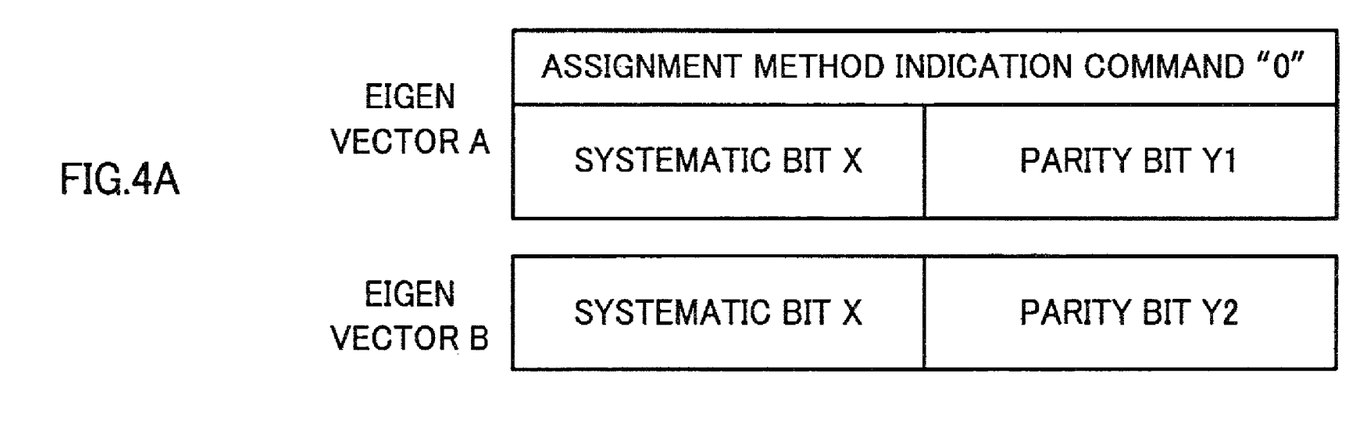
FIG. 4A illustrates coded data transmitted with each eigen vector of the communication apparatus according to Embodiment 1 of the present invention.
Figure 4B:
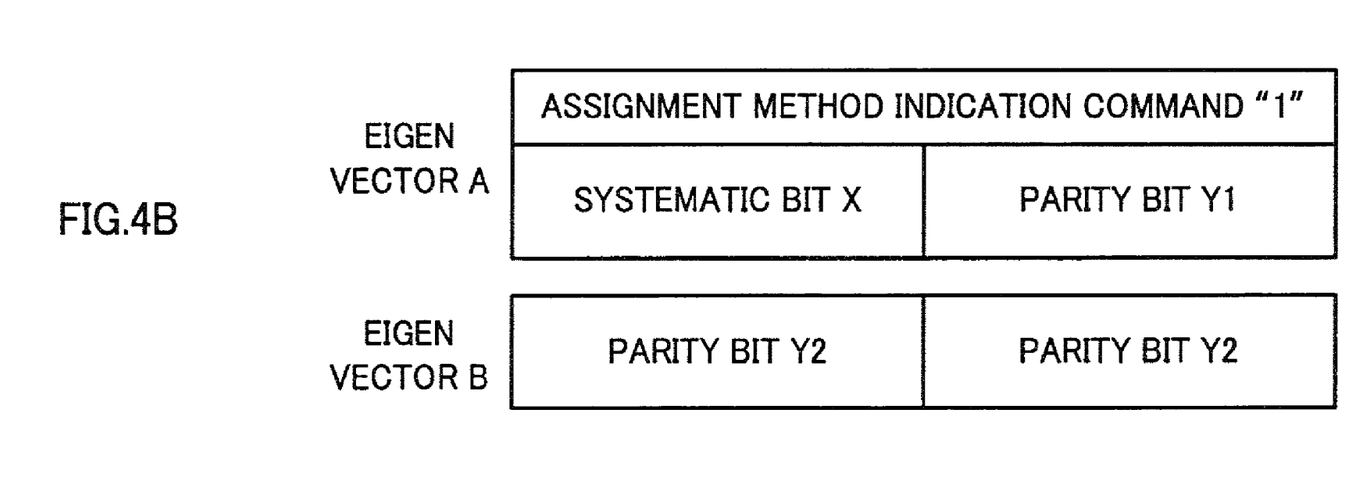
FIG. 4B illustrates coded data transmitted with each eigen vector of the communication apparatus according to Embodiment 1 of the present invention.

Next, details of the processing by the assignment method selection section 104 and code assignment section 152 will be explained using FIG. 4A and FIG. 4B. FIG. 4A and FIG. 4B illustrate data transmitted with the respective eigen vectors of this embodiment. FIG. 4A shows coded data transmitted with the eigen vectors when the ratio between a maximum eigen value and other eigen values is equal to or lower than a threshold, while FIG. 4B shows coded data transmitted with the eigen vectors when the ratio between a maximum eigen value and other eigen values is greater than the threshold.

When the ratio between a maximum eigen value and other eigen values is equal to or lower than the threshold, the assignment method selection section 104 selects a code assignment method of transmitting systematic bits with the respective eigen vectors and outputs a command "0" which indicates this selection result.

When code assignment section 152 receives the assignment method indication command "0" from the assignment method selection section 104, it outputs a systematic bit X and a parity bit Y1 to the modulation section 154 and outputs the systematic bit X and parity bit Y2 to the modulation section 155, and controls the repetition section 153 so as to stop outputting coded data.

As a result, the communication apparatus 100 transmits the systematic bit X with the respective eigen vectors A, B as shown in FIG. 4A.

On the other hand, when the ratio between the maximum eigen value and other eigen values is greater than the threshold, the assignment method selection section 104 selects a code assignment method of transmitting systematic bits with only an eigen vector having a maximum eigen value and outputs a command "1" indicating this selection result.

When the code assignment section 152 receives the assignment method indication command "1" from the assignment method selection section 104, it outputs the systematic bit X and parity bit Y1 to the modulation section 154 and controls the repetition section 153 so as to output coded data to the modulation section 155.

As a result, the communication apparatus 100 transmits the systematic bit X with only the eigen vector A having a maximum eigen value and transmits the parity bit Y2 repeated with the eigen vector B as shown in FIG. 4B. Using repetition with eigen vectors having small eigen values can improve signal quality and make the quality of different beams uniform.

Thus, by transmitting systematic bits with the respective eigen vectors when the respective eigen values are uniform and transmitting systematic bits with only the eigen vector having the maximum eigen value when the maximum eigen value is much greater than the other eigen values, it is possible to obtain a maximum effect by combining a turbo code and MIMO through improvement of communication quality.

In both cases of FIG. 4A and FIG. 4B, the communication apparatus 100 transmits an assignment method indication command with the eigen vector A having the maximum eigen value. This can reduce decision errors when the receiving side decides the assignment method and improve stability of the system.

In the cases of FIG. 4A and FIG. 4B, a signal transmitted from the other party of communication with the eigen vector A having the maximum eigen value is demodulated by the demodulation section 106, and therefore the assignment method decision section 108 extracts an assignment method indication command from the output signal of the demodulation section 106, decides the content ("0" or "1") and can thereby know the code assignment method of the other party of communication.

EMBODIMENT 2

Figure 5:
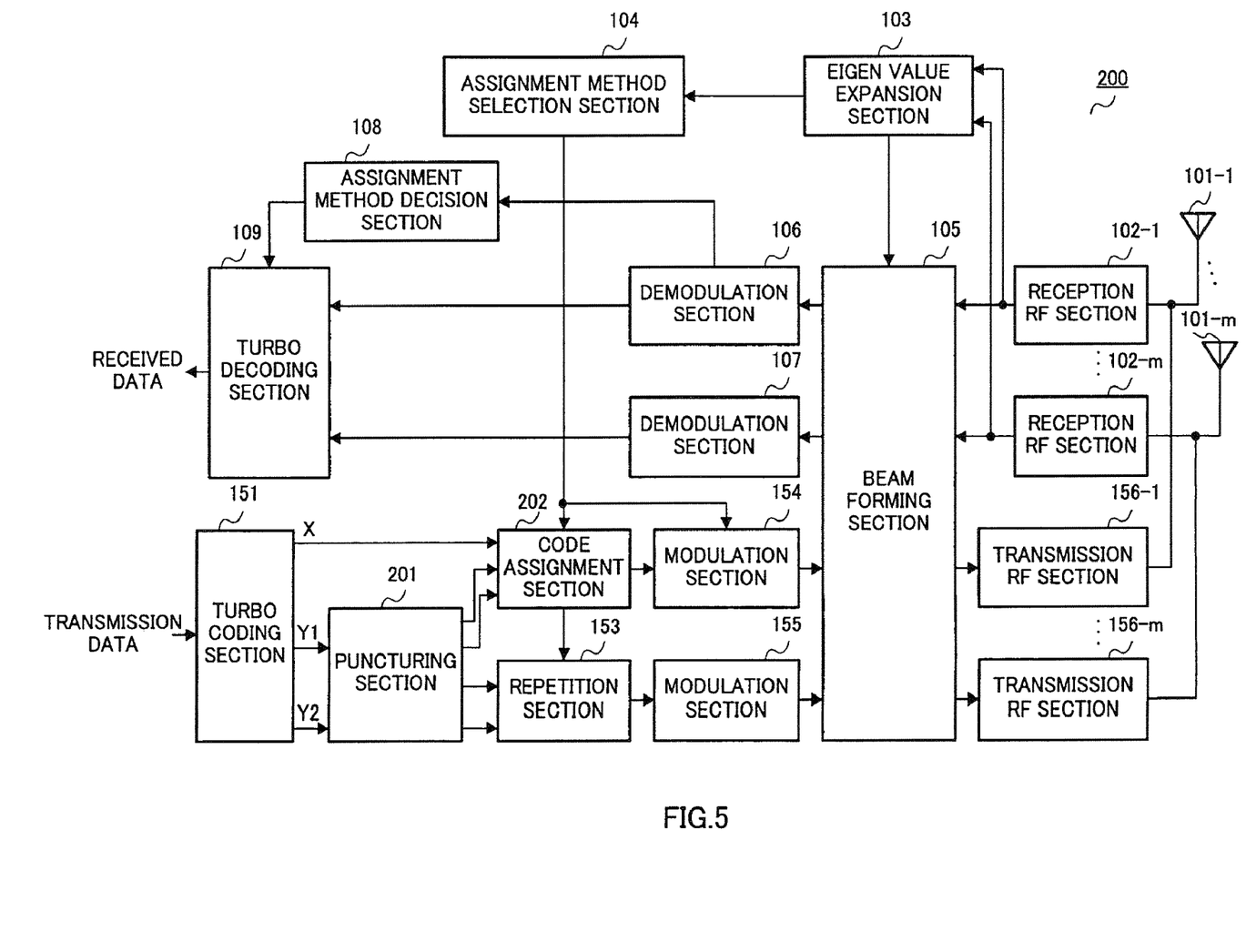
FIG. 5 is a block diagram showing the configuration of a communication apparatus according to Embodiment 2 of the present invention.

FIG. 5 is a block diagram showing the configuration of a communication apparatus according to Embodiment 2 of the present invention and the communication apparatus 200 in FIG. 5 is one of the communication apparatuses 10, 20 shown in FIG. 2.

In the communication apparatus 200 shown in FIG. 5, components common to those of the communication apparatus 100 shown in FIG. 3 are assigned the same reference numerals as those in FIG. 3 and explanations thereof will be omitted. The communication apparatus 200 in FIG. 5 adopts the configuration of the communication apparatus 100 in FIG. 3 with a puncturing section 201 added. Furthermore, in the communication apparatus in FIG. 5, a code assignment section 202 carries out processing different from the code assignment section 152 in FIG. 3.

A turbo coding section 151 outputs a systematic bit X to the code assignment section 202 and outputs parity bits Y1, Y2 to the puncturing section 201.

The puncturing section 201 punctures the parity bits Y1, Y2 and outputs the remaining parity bits Y1, Y2 to the code assignment section 202 and outputs the punctured parity bits Y1', Y2' to a repetition section 153.

The repetition section 153 carries out repetition processing on the coded data (parity bits Y1', Y2') output from the puncturing section 201 and outputs the coded data after the repetition processing according to a control signal from the code assignment section 202 to a modulation section 155.

Based on an assignment method indication command from an assignment method selection section 104, the code assignment section 202 outputs the coded data output from the turbo coding section 151 and puncturing section 201 to the modulation section 154 or modulation section 155 and outputs a control signal to the repetition section 153.

More specifically, when the code assignment section 202 receives an assignment method indication command "0" from the assignment method selection section 104, it outputs the systematic bit X and parity bits Y1, Y2 to the modulation sections 154, 155 respectively and controls the repetition section 153 so as to stop outputting coded data.

Figure 6A:
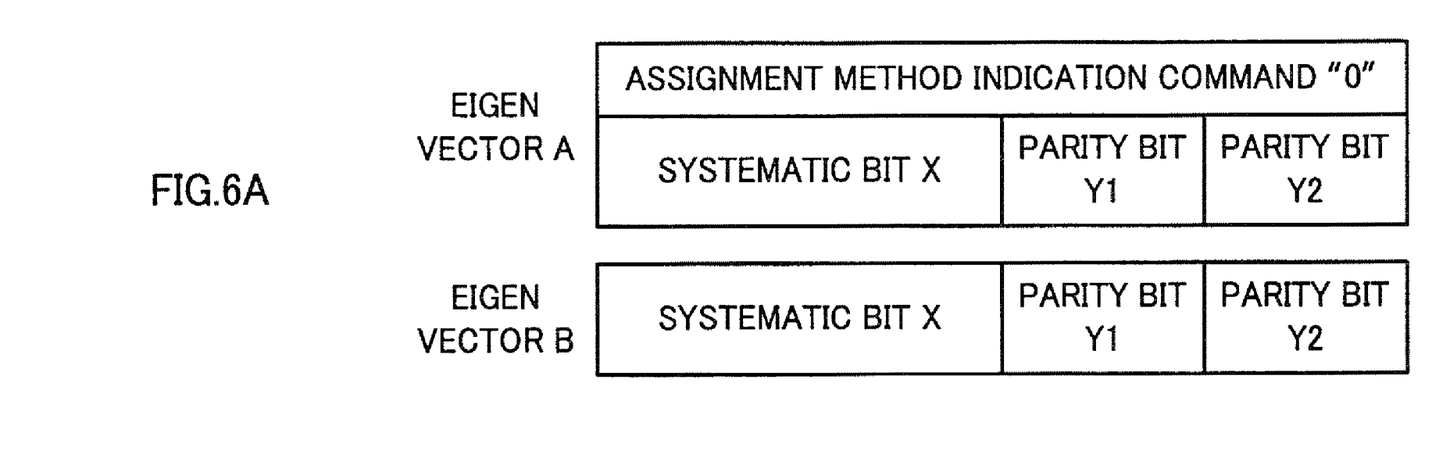
FIG. 6A illustrates coded data transmitted with each eigen vector of the communication apparatus according to Embodiment 2 of the present invention.

As a result, as shown in FIG. 6A, the communication apparatus 100 transmits the systematic bit X and parity bits Y1, Y2 with eigen vectors A, B. Therefore, it is possible to complete signals transmitted from the respective eigen vectors as one coding unit.

On the other hand, when the code assignment section 202 receives an assignment method indication command "1" from the assignment method selection section 104, it outputs the systematic bit X and parity bits Y1, Y2 to the modulation section 154 and controls the repetition section 153 so as to output the coded data to the modulation section 155.

Figure 6B:
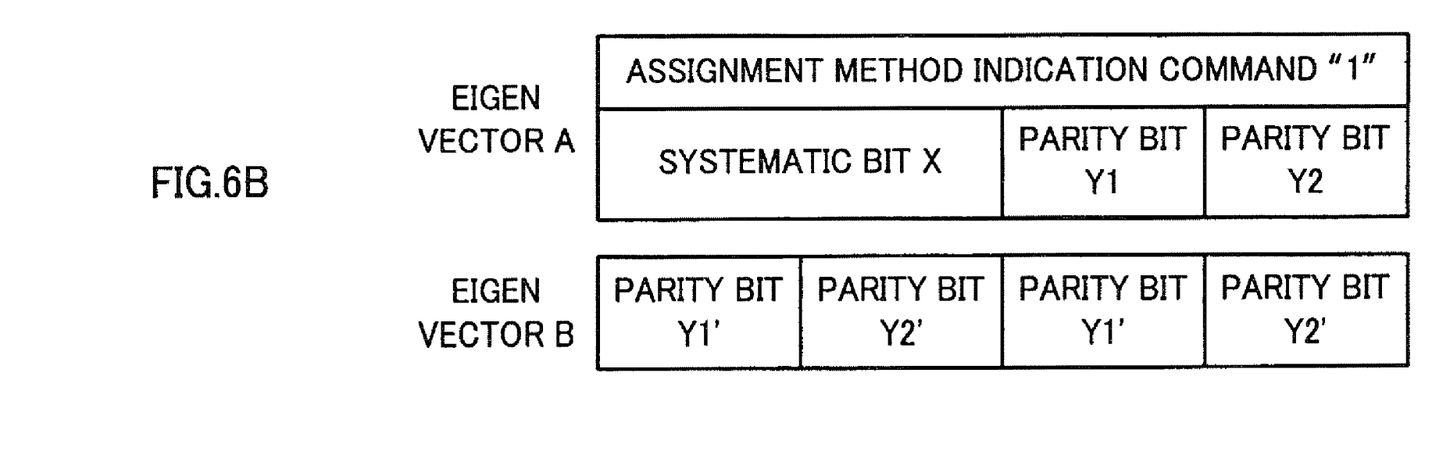
FIG. 6B illustrates coded data transmitted with each eigen vector of the communication apparatus according to Embodiment 2 of the present invention.

As a result, as shown in FIG. 6B, the communication apparatus 100 transmits the systematic bit X, parity bits Y1, Y2 with the eigen vector A and transmits the parity bits Y1', Y2' punctured with the eigen vector B and repeated. Therefore, it is possible to complete a signal transmitted from the eigen vector A having the maximum eigen value as one coding unit and assign an auxiliary role when decoding to the coded data transmitted from the eigen vector B having a value other than the maximum eigen value.

As in the case of Embodiment 1, in any one of FIG. 6A, FIG. 6B, the communication apparatus 200 transmits the assignment method indication command from the eigen vector A having the maximum eigen value.

Furthermore, the above described embodiments have explained the case with two eigen vectors, but the present invention places no limit on the number of eigen vectors. Furthermore, the configuration of the turbo coder in the present invention is not limited to the one illustrated in FIG. 1.

As described above, according to the present invention, the communication system which combines a turbo code and MIMO controls the type of coded data to be transmitted with the respective eigen vectors based on the ratio between the maximum eigen value and other eigen values, and can thereby obtain a maximum effect of combining the turbo code and MIMO in realizing improvement of communication quality.

This application is based on the Japanese Patent Application No. 2003-040217 filed on Feb. 18, 2003, entire content of which is expressly incorporated by reference herein.

INDUSTRIAL APPLICABILITY

The present invention is suitable for use in a communication apparatus in a communication system which combines a turbo code and MIMO.

[FIG. 1]
DATA
INTERLEAVER

[FIG. 2]
EIGEN VECTOR B
EIGEN VECTOR A

[FIG. 3]
RECEIVED DATA
TRANSMISSION DATA
109 TURBO DECODING SECTION
151 TURBO CODING SECTION
104 ASSIGNMENT METHOD SELECTION SECTION
108 ASSIGNMENT METHOD DECISION SECTION
152 CODE ASSIGNMENT SECTION
153 REPETITION SECTION
106 DEMODULATION SECTION
107 DEMODULATION SECTION
154 MODULATION SECTION
155 MODULATION SECTION
103 EIGEN VALUE EXPANSION SECTION

105 BEAM FORMING SECTION
102-1 RECEPTION RF SECTION
102-m RECEPTION RF SECTION
156-1 TRANSMISSION RF SECTION
156-m TRANSMISSION RF SECTION

[FIG. 4A]
ASSIGNMENT METHOD INDICATION COMMAND "0"
EIGEN VECTOR A
SYSTEMATIC BIT X PARITY BIT Y1
EIGEN VECTOR B
SYSTEMATIC BIT X PARITY BIT Y2

[FIG. 4B]
ASSIGNMENT METHOD INDICATION COMMAND "1"
EIGEN VECTOR A
SYSTEMATIC BIT X PARITY BIT Y1
EIGEN VECTOR B
SYSTEMATIC BIT X PARITY BIT Y2

[FIG. 5]
RECEIVED DATA
TRANSMISSION DATA
109 TURBO DECODING SECTION
151 TURBO CODING SECTION
108 ASSIGNMENT METHOD DECISION SECTION
201 PUNCTURING SECTION
104 ASSIGNMENT METHOD SELECTION SECTION
202 CODE ASSIGNMENT SECTION
153 REPETITION SECTION
106 DEMODULATION SECTION
107 DEMODULATION SECTION
154 MODULATION SECTION
155 MODULATION SECTION
103 EIGEN VALUE EXPANSION SECTION
105 BEAM FORMING SECTION
102-1 RECEPTION RF SECTION
102-m RECEPTION RF SECTION
156-1 TRANSMISSION RF SECTION
156-m TRANSMISSION RF SECTION

[FIG. 6A]
ASSIGNMENT METHOD INDICATION COMMAND "0"
EIGEN VECTOR A
SYSTEMATIC BIT X PARITY BIT Y1 PARITY BIT Y2
EIGEN VECTOR B
SYSTEMATIC BIT X PARITY BIT Y1 PARITY BIT Y2

[FIG. 6B]
ASSIGNMENT METHOD INDICATION COMMAND "1"
EIGEN VECTOR A
SYSTEMATIC BIT X PARITY BIT Y1 PARITY BIT Y2
EIGEN VECTOR B
PARITY BIT Y1' PARITY BIT Y2' PARITY BIT Y1' PARITY BIT Y2'

What is claimed is:

1. A MIMO transmission apparatus comprising:
a turbo coding section that carries out turbo coding to transmission data;
a calculation section that calculates an eigen value of each of a plurality of eigen vectors;
a control section that controls an assignment of coded data to be transmitted with said each eigen vector based on the each eigen value; and
a transmission section that transmits said coded data with said each eigen vector based on the controlled assignment.

2. A MIMO reception apparatus comprising:
a reception section that receives coded data with a plurality of eigen vectors and information about an assignment of coded data with each eigen vector from the transmission apparatus according to claim 1; and
a turbo decoding section that carries out turbo de decoding to said coded data based on said information.

3. A MIMO transmission method of a transmission apparatus including a turbo coding section, a calculation section, a control section, and a transmission section, the method comprising:
a step of carrying out turbo coding to transmission data in the turbo coding section;
a step of calculating an eigen value of each of a plurality of eigen vectors in the calculation section;
a step of controlling an assignment of coded data to be transmitted with said each eigen vector based on the each eigen value in the control section; and
a step of transmitting said coded data with said each eigen vector based on the controlled assignment in the transmission section.

4. A MIMO reception method of a reception apparatus including a reception section and a turbo decoding section, the method comprising:
a step of receiving coded data with a plurality of eigen vectors and information about an assignment of coded data with each eigen vector from the transmission apparatus according to claim 3 in the reception section; and
a step of carrying out turbo decoding to said coded data based on said information in the turbo decoding section.

* * * * *

UNITED STATES PATENT AND TRADEMARK OFFICE
CERTIFICATE OF CORRECTION

PATENT NO. : 7,627,292 B2 Page 1 of 1
APPLICATION NO. : 11/857552
DATED : December 1, 2009
INVENTOR(S) : Masayuki Hoshino et al.

It is certified that error appears in the above-identified patent and that said Letters Patent is hereby corrected as shown below:

On the title page Item (30), Foreign Application Priority Data, which should read:

"February 18, 2003 (JP)..........................................2003-040217"

Also, claim 2, column 8, line 22

"a turbo decoding section that carries out turbo de decoding"

should read:

"a turbo decoding section that carries out turbo decoding"

Signed and Sealed this

Eighth Day of June, 2010

David J. Kappos
*Director of the United States Patent and Trademark Office*